J. L. SHEPPARD.
APPARATUS FOR RESHAPING AND COMPRESSING PLANTATION COTTON BALES.
APPLICATION FILED MAR. 10, 1913.
1,071,811.
Patented Sept. 2, 1913.
5 SHEETS—SHEET 1.
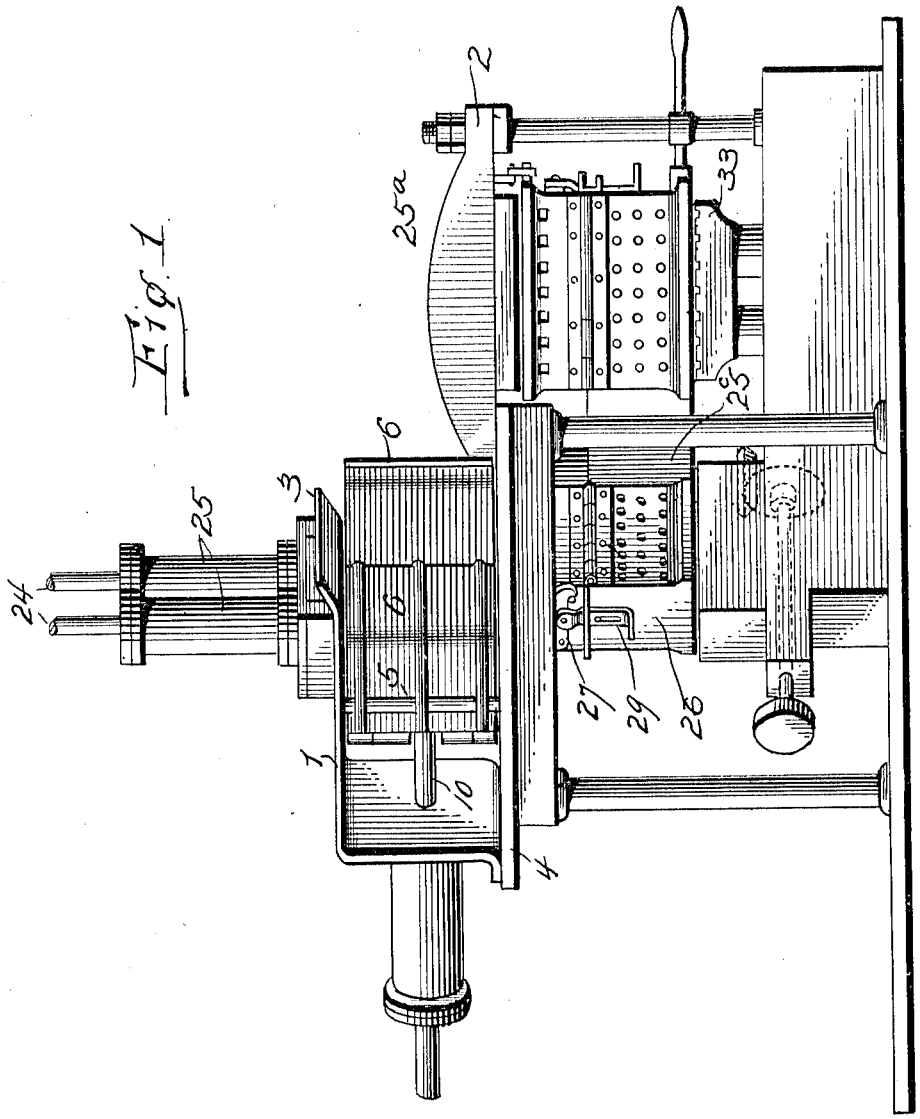
WITNESSES
INVENTOR
J. L. Sheppard
By H. A. Seymour
Attorney J. L. SHEPPARD.
APPARATUS FOR RESHAPING AND COMPRESSING PLANTATION COTTON BALES.
APPLICATION FILED MAR. 10, 1913.
1,071,811.
Patented Sept. 2, 1913.
5 SHEETS—SHEET 2.
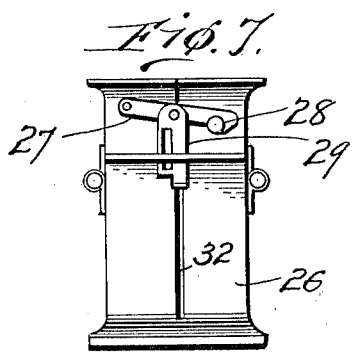
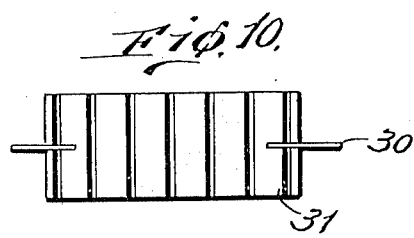
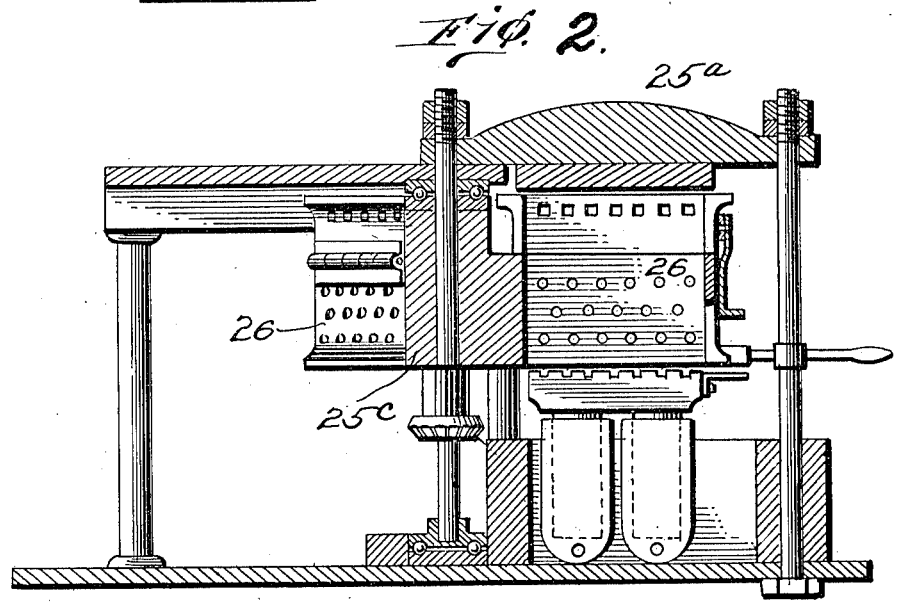
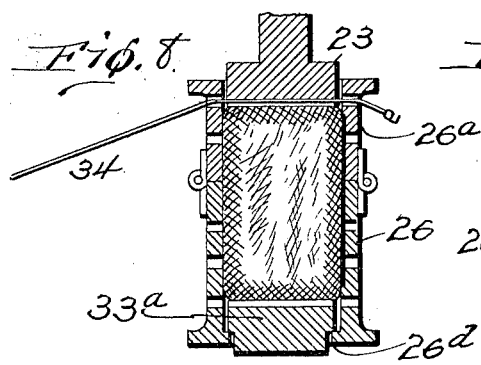
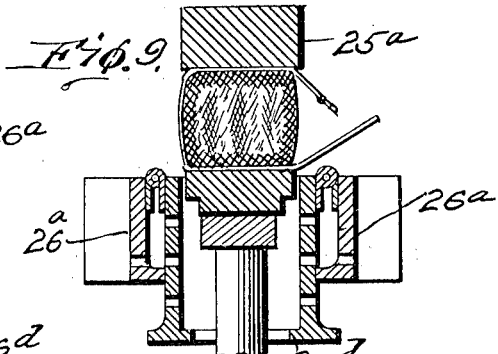
WITNESSES
INVENTOR
J. L. Sheppard
By H. A. Seymour
Attorney J. L. SHEPPARD.
APPARATUS FOR RESHAPING AND COMPRESSING PLANTATION COTTON BALES.
APPLICATION FILED MAR. 10, 1913.
1,071,811.
Patented Sept. 2, 1913.
5 SHEETS—SHEET 3.
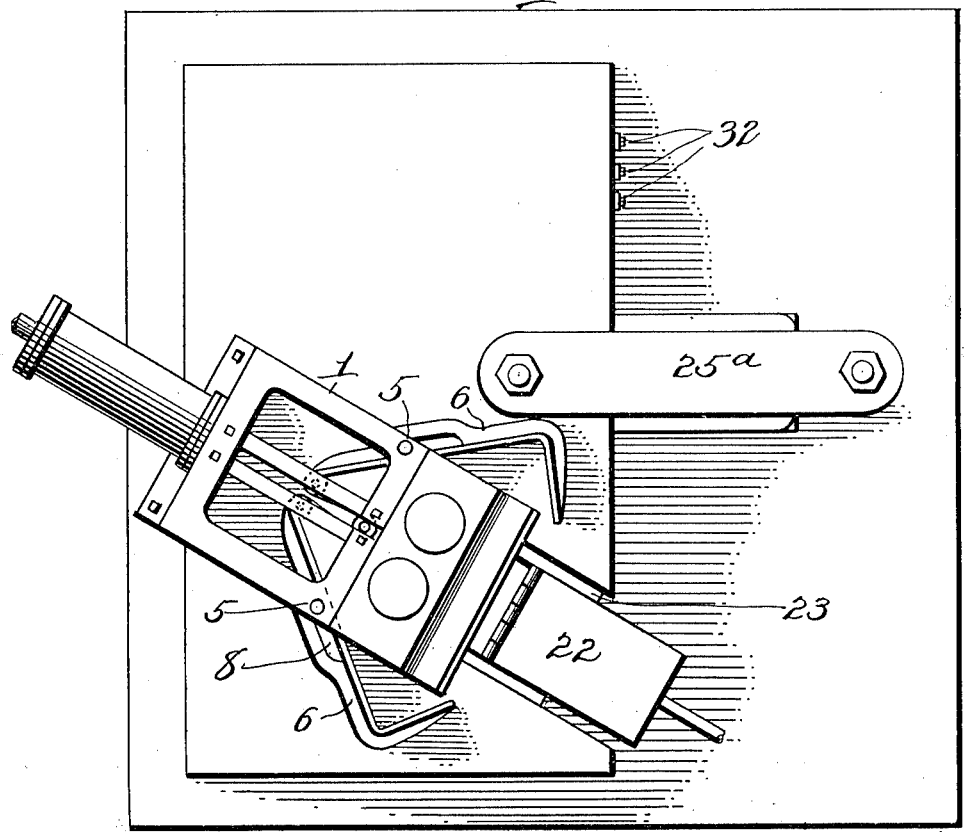
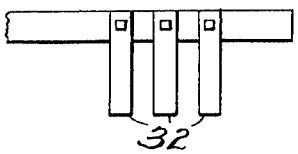
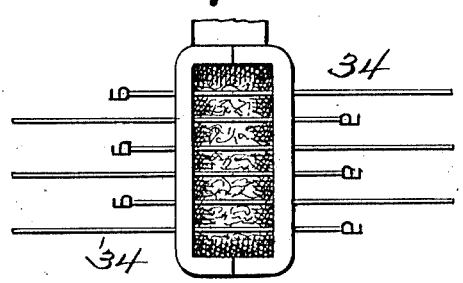

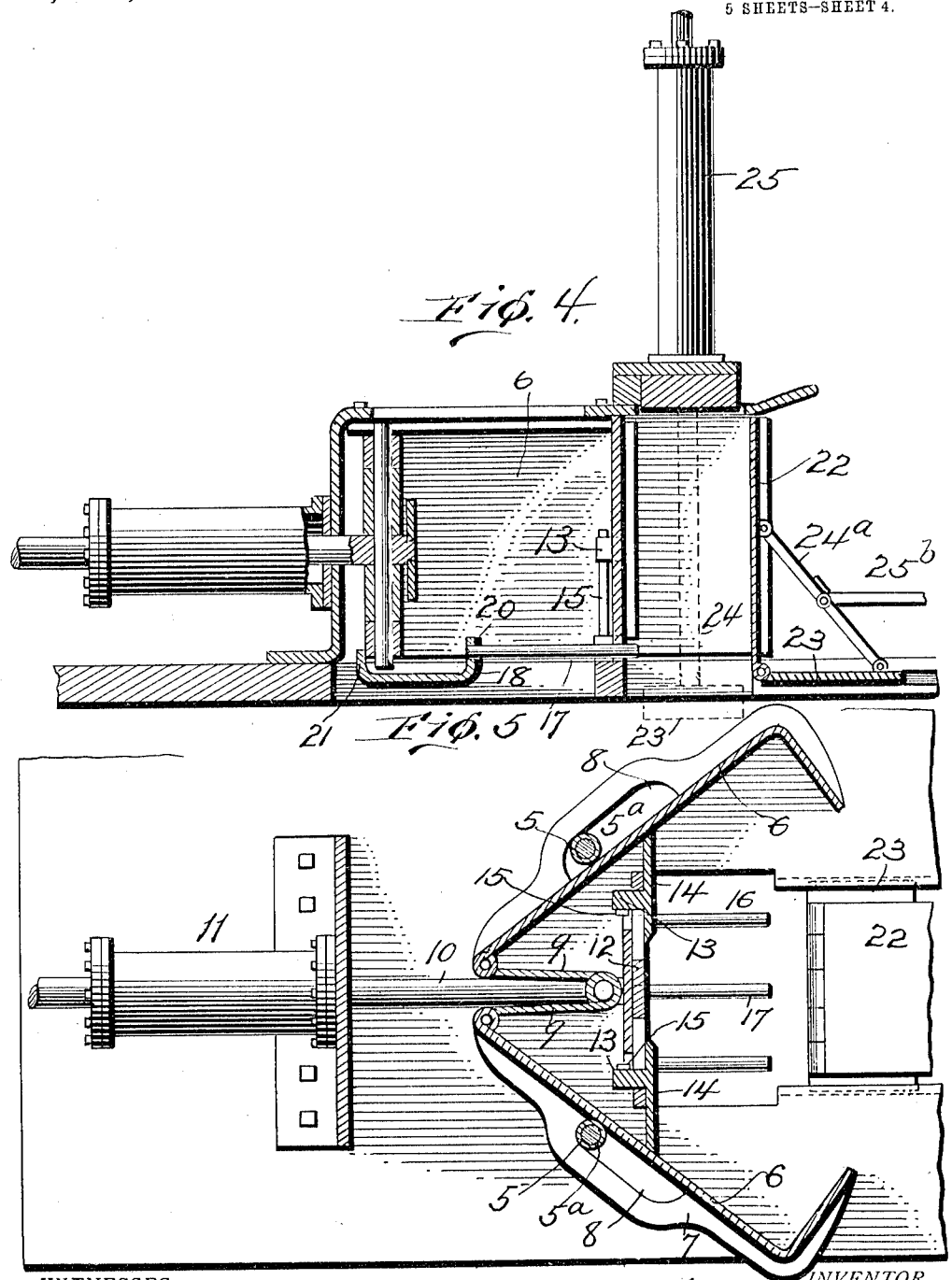

J. L. SHEPPARD.
APPARATUS FOR RESHAPING AND COMPRESSING PLANTATION COTTON BALES.
APPLICATION FILED MAR. 10, 1913.
1,071,811.
Patented Sept. 2, 1913.
5 SHEETS—SHEET 5.
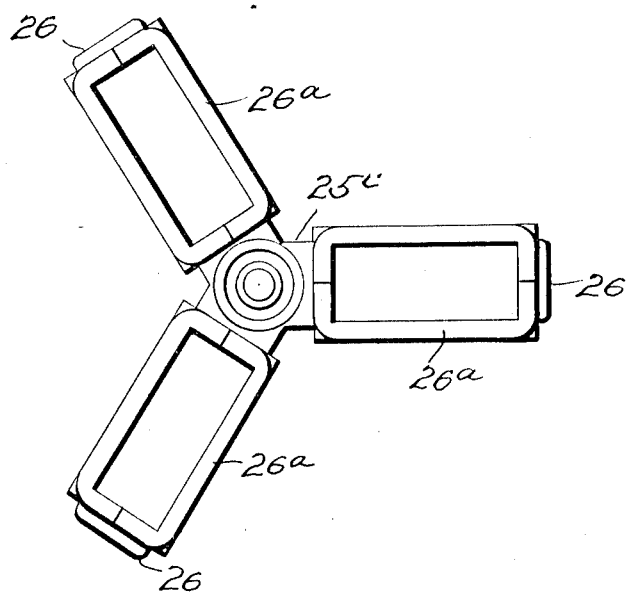
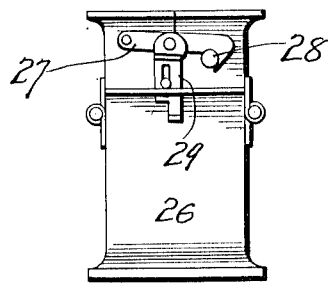
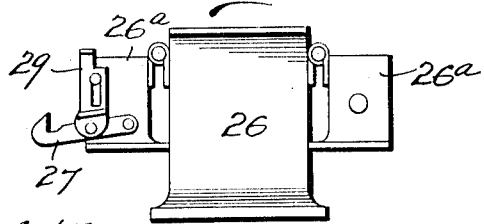
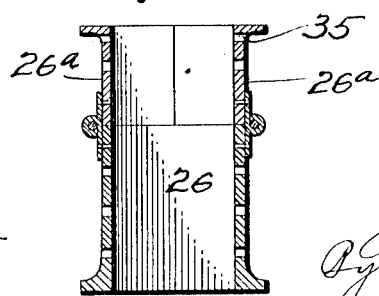
WITNESSES
J. M. Fowler Jr.
G. F. Downing.
INVENTOR
J. L. Sheppard
By H. A. Seymour
Attorney

UNITED STATES PATENT OFFICE.

JOHN L. SHEPPARD, OF CHARLESTON, SOUTH CAROLINA, ASSIGNOR OF ONE-FOURTH TO C. B. HUIET, OF CHARLESTON, SOUTH CAROLINA, AND THREE-FOURTHS TO JOHN L. SHEPPARD, JR., OF NEWARK, OHIO.

APPARATUS FOR RESHAPING AND COMPRESSING PLANTATION COTTON-BALES.

1,071,811. Specification of Letters Patent. Patented Sept. 2, 1913.

Application filed March 10, 1913. Serial No. 753,372.

*To all whom it may concern:*

Be it known that I, JOHN L. SHEPPARD, of Charleston, in the county of Charleston and State of South Carolina, have invented certain new and useful Improvements in Apparatus for Reshaping and Compressing Plantation Cotton-Bales; and I do hereby declare the following to be a full, clear, and exact description of the invention, such as will enable others skilled in the art to which it appertains to make and use the same.

My invention relates to an improvement in apparatus for reshaping and compressing plantation cotton bales, the object being to provide means for reducing the plantation bales to uniform size as to length and width; forcing the reshaped bale from the reshaping press into a compress located in a plane below the shaping press, and finally ejecting the compressed bale.

My invention consists in the parts and combination of parts and in the details of construction as will be more fully explained and pointed out in the claims.

In the accompanying drawings, Figure 1 is a view in elevation of my improved apparatus. Fig. 2 is a view in section through the compress box and the box carrying frame. Fig. 3 is an enlarged view in plan of the reshaping press showing the jaws open. Fig. 4 is a view in vertical section through the reshaping press showing the jaws closed. Fig. 5 is a view in horizontal section showing the jaws open. Fig. 6 is a view in plan of the frame carrying the compress boxes. Fig. 7 is an end view of one of the boxes. Fig. 8 is a view in cross of a box and platen showing the bale before compression. Fig. 9 is a similar view showing the bale compressed and the sides of the box open. Fig. 10 is a plan view of one of the platens. Fig. 11 is a plan view of one of the boxes with the bale therein and showing the bands in place. Fig. 12 is a view of an ejector, and Figs. 13, 14 and 15 are views of a modified form of box.

My apparatus comprises a reshaping press 1 located preferably on the floor above the compress 2. The reshaping press consists of a frame composed of top and bottom plates 3 and 4, the free front end of the top plate being turned upwardly as shown in Fig. 1. Secured to the top and bottom plates are the posts 5 on which the jaws 6 are mounted. The posts are preferably mounted to revolve, or if preferred may be provided with sleeves 5ª which revolve and the jaws are substantially L-shape as shown in Fig. 3, and each is provided on its outer face with a rib 7 having a slot 8 through which the posts pass, the said posts acting as fulcrums on which the jaws 6 move and turn. The jaws are as wide as the space between the top and bottom plates 3 and 4 and are connected at their rear ends to the toggle levers 9, which latter are centrally secured to the front end of the plunger 10. This plunger, which may be actuated by steam or water in the well known manner, preferably extends through the cylinder 11 as shown in Figs. 4 and 5 so as to guide the plunger and prevent undue wear on the front gland of the cylinder. Located intermediate the top and bottom plates 3 and 4 of the reshaping press and also between the jaws, is the fixed rear wall 12 of the press chamber. This rear wall 12 is slotted for the passage of the lugs 13 on the end extension 14 of the rear wall, and the rearwardly extending lugs bear against the springs 15, which latter are secured at their lower ends to the lower plate 4 or other part of the apparatus, and operate to normally hold the end extensions in their projected positions against the jaws as shown in Fig. 5. The lower plate 4 is provided in advance of the rear wall with an opening 16 which latter conforms as to size with the length and width of the compress boxes to be hereinafter referred to. Mounted in the rear wall 13 of the press box is a series of fingers 17 connected at their rear ends to the sliding frame 18. These fingers are approximately as long as the opening 16 is wide, so that when they are projected as in Fig. 5, they will form a bottom on which the plantation bale will rest during the process of reshaping the same. The fingers are all connected at their rear ends to the frame 18 which latter is mounted to slide in a slot in the lower plate 4, and is provided with upturned ends 20 and 21, which latter are located in the path of movement of the toggle joint of the levers 9 as shown in Fig. 4. It will therefore be seen that in the opening movement of the jaws 6, which is accomplished of course by a forward movement of plunger 10, the toggle joint strikes the upturned end 20 of sliding frame 18 and moves the latter forwardly, and in the closing movement of the jaws, and after the latter have closed onto the bale sufficiently to hold the same, the toggle joint strikes the rear upturned end of the frame 18, and moves it rearwardly thus retracting the fingers and leaving the reshaped bale free to be ejected into the compress box below. The front or free ends of the jaws 6 are at right angles to the main bodies of the jaws, and when open, as shown in Fig. 5, are separated sufficiently to permit of the entrance of the longest plantation bale. Located in front of the opening 16 in the lower plate 4 of the press frame, is a gate 22 hinged at one end to the base plate 23 which latter is slidingly mounted in a grooved way in said lower plate. The gate 22 and plate 23 are also connected by toggle levers 24ª (see Fig. 4) which are operated by the pitman 25ᵇ, whereby the gate may be raised and lowered and the gate and its base plate moved rearwardly so as to bring the gate within the plane of the outer bent ends of the jaws 6. The operation of this portion of the apparatus is as follows: A plantation bale of any size is placed between the jaws, against the rear wall 12 of the box, after which the gate 22 is turned to its upright position, and slid inwardly toward and against the outer side of the bale. If desired the bale may be placed on gate 22 and entered into the reshaping chamber by elevating the gate. By now actuating the plunger 12 the jaws 6 are first turned on the posts 5, in a direction to close the jaws against the ends of the bale. This presses the ends of the bale toward each other, but as the bands have been previously removed, the mass is comparatively free to flow and conform itself to the shape of the reshaping press chamber. While the jaws are closing they are also being pulled rearwardly, but the rearward movement is not completed until after the jaws have fully closed. As the free ends of the jaws 6 approach each other they overlap the gate 22 which latter operates to close the space between the free ends of the jaws and prevent the cotton from bulging at this point, and as the jaws approach their closed position and after they have fully closed and are pulled rearwardly during their final pressing movement, they draw the gate 22 back with them. As the jaws close they force the end extensions of the rear wall 12 toward each other, and pull the gate 22 back toward the rear wall so that when the jaws have fully closed, the mass or bale of cotton between the jaws has been reshaped to conform to the length and width of the compress boxes. As the jaws approach their closed positions the upturned end 21 of the frame 18, is engaged by the hinge joint of the toggle levers 9 and is drawn rearwardly thus pulling the bale supporting fingers from under the reshaped bale and leaving the latter free to be ejected from the reshaping press into the box of the compress, by the platen 23 on plunger 24 which latter may be actuated by steam or water.

In order to prevent lateral stresses on the plunger 10, the pin connecting the toggle levers 9 to the plunger 10, moves in guideways in the upper and lower plates 3 and 4, so that the movement of the joint of the toggle levers is a straight back and forth movement.

Located below the reshaping press is the frame 25ᶜ carrying a series of compress boxes 26. In the present instance I have shown three boxes but I may use two or more than three. The frame 25ᶜ is mounted to turn and the boxes thereon are so located that when one box is under the reshaping press another will be immediately over the platen or plungers of a compress and under the head 25ª of the compress, so that one bale may be compressed while another is being reshaped and fed to a compress box. Each compress box 26 is made of metal preferably of steel open at its top and bottom. The lower section of the box is made preferably an integral structure, with holes therein if desired, and the upper part made of two sections 26ª hinged to the lower section as shown in Fig. 8, so that they may be released and thrown to open position as in Fig. 9. One hinged section 26ª is provided with a locking latch or hook 27, preferably one at each end, and the other with a lug or keeper 28 adapted to be engaged by the latch for locking the hinged members in their closed positions. Each latch 27 is provided with a member 29 pivoted thereto and depending therefrom, so as to be engaged by the tripping fingers 30 on the ends of the platen 31. These fingers project through slots 32 in the ends of the box, in the plane of the lower ends of the members 29, so that when the platen reaches a predetermined height within the box 26, the tripping fingers will engage the depending members 29 and elevate the hooks 27 sufficiently to disengage the latter from their lugs or keepers 28, and thus allow the expansion of the bale to throw the hinged sections from their closed to their open position. The hinged sections are not released however until the lower edge of the bale is slightly above the top of the lower integral section of the box, and when the bale is released by the opening up of the hinged side members, the expansion of the bale prevents the latter from falling back into the box, so that after the platen has been lowered the bale rests on the top of the box, and as the frame 25ᶜ is turned so as to bring the next box under the compress head and over the compress platen, the compressed and bound bale will be moved into contact with the fixed ejectors 32 and rolled from off the box.

In the preferred construction shown in Fig. 2, I have shown the platen 33 of the compress, fixed to the compress plungers so that the bottom of the compress boxes are normally open, the friction of the cotton with the sides and ends of the box preventing the cotton from moving any lower into the boxes than it is forced by the ejector plunger 23 of the reshaping press, but if desired I may use platen 33ª separate from the compress plunger, and forming the bottom of the compress boxes as shown in Figs. 8 and 9. In this construction each box has its platen, and each platen is provided with shoulders which overhang the shoulders 26ª at the bottom of the box. Again instead of providing the box with slots for the passage of the tripping fingers 30 on the platen, the ends of the box may be solid as shown in Figs. 13, 14 and 15, and other means provided for releasing the locking hooks.

After the plantation bale stripped of its bands has been forced into the compress box, and while under the pressure of the ejector plunger 23, the bale bands 34 are passed through the holes 35 in the hinged top section of the compress boxes and through grooves in the underside of the ejector plunger 23, over the cotton, and the box is moved with the bands so placed, around to the compress plunger. After the cotton has been compressed and while it is still under compression, but after the hinged sides have been forced open, the bands are passed through grooves in the platen 33, or platen 33ª as the case may be, under the bale and secured in the usual manner by ties, after which the compress plungers are lowered thus permitting the box with the compressed bale resting thereon to be moved under the fixed ejectors 32, which as before explained roll the bale off the box, after which the sides are closed up by hand or otherwise and is then ready to receive the cotton from the reshaping press.

With this improvement plantation bales of any size and shape may be reshaped and compressed to uniform shape and of any density obtainable in the compress.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters Patent, is:—

1. In apparatus for reshaping and compressing plantation cotton bales, the combination of a pair of jaws fulcrumed intermediate their ends, means engaging said jaws at one end for actuating them, a compress located in a plane below the jaws for compressing the bale after it has been reshaped between the jaws, and means for forcing the reshaped bales from between said jaws into the compress below the jaws.

2. In apparatus for reshaping and compressing plantation cotton bales, the combination of a pair of jaws fulcrumed intermediate their ends, means engaging said jaws at one end for actuating them, a compress located in a plane below the jaws for compressing the bale after it has been reshaped between the jaws, the said compress comprising upper and lower platens, and a plurality of connected compress boxes mounted to be moved in succession from under the reshaping jaws to a position between the platens of the compress.

3. In a reshaping press the combination with fixed top and bottom plates, movable jaws intermediate said fixed plates and forming walls of the reshaping chamber, the said jaws being fulcrumed intermediate their ends, and means engaging the jaws at one end for actuating them.

4. In a reshaping press, the combination of fixed top and bottom plates and two jaws intermediate said plates, the jaws being fulcrumed intermediate their ends, and the free ends thereof being bent inwardly toward each other, and actuating means connected with the rear ends of the jaws for turning them on their fulcrums and for moving them rearwardly.

5. In a reshaping press, the combination of fixed top and bottom plates, two L-shaped jaws located between said plates, a fixed rear wall intermediate the two jaws, the jaws being fulcrumed intermediate their ends, and means connecting the rear ends of the jaws for actuating them.

6. In a reshaping press, the combination of two L-shaped jaws having a closing and opening movement and an endwise movement, the said jaws being fulcrumed intermediate their ends and means engaging the rear ends of the jaws for actuating them.

7. In a reshaping press, the combination of two L-shaped jaws fulcrumed intermediate their ends, a fixed rear wall having extensible ends located intermediate the two jaws, and means connected with both jaws at their rear ends for opening and closing them.

8. In a reshaping press, the combination of two L-shaped jaws fulcrumed intermediate their ends, a hinged gate adapted to be overlapped by the front ends of the jaws and complete the closure of the chambers at the front, and means connected with the rear ends of the jaws for opening and closing them.

9. In a reshaping press, the combination of two L-shaped jaws fulcrumed intermediate their ends and means connected with the rear ends of the jaws for rocking the latter on their fulcrums.

10. In a reshaping press, the combination of two L-shaped jaws fulcrumed intermediate their ends, a hinged gate, means for raising and lowering the gate, and means for closing the jaws whereby the gate will be overlapped by the L-shaped ends of the jaws.

11. In a reshaping press, the combination of two L-shaped jaws fulcrumed intermediate their ends and having a swinging movement toward and away from each other and also having a longitudinally sliding movement, a rear wall intermediate the jaw, a sliding base adjacent the front ends of the jaw, a gate hinged to said base and adapted to be overlapped by the jaws when the latter are closed, and means for swinging the jaws on their pivots and for moving them and the gate rearwardly.

12. In a reshaping press, the combination of a base plate having an opening therein, jaws located on opposite sides of the opening, means adapted to project across said opening and form a support for the bale prior to the closing movement of the jaws, means for opening and closing the jaws and means for retracting and projecting the bale supporting means, whereby when the plantation bale has been reshaped it will be unsupported below and may be ejected through the opening.

13. In a reshaping press, the combination of a base plate having a rectangular opening therein, L-shaped jaws located adjacent the ends of the opening, the said jaws being fulcrumed intermediate their ends, means adapted to project across the opening and form a support for the bale prior to the closing movement of the jaws, means for opening and closing the jaws, means for retracting and projecting the bale supporting means, and means for ejecting the bale through the opening in the base plate.

14. In apparatus for reshaping and compressing plantation bales, the combination with a reshaping press, and a compress, the latter comprising a plunger, a platen, a head and a frame carrying a plurality of compress boxes, into which the cotton is ejected from the reshaping press, each box having hinged sections at its upper edge, means for locking the hinged sections in closed position and means for automatically unlocking said hinged sections at the termination of the upward movement of the compress platen.

15. In apparatus for reshaping and compressing plantation cotton bales the combination of a reshaping press and a compress consisting of a plunger, a head, a platen and a frame carrying a series of boxes adapted to be brought consecutively under the reshaping press and the head of the compress, the upper portion of each box being made in sections hinged to the main portion of the box, means for locking the hinged sections together and means carried by the platen of the compress for actuating the locking means to release the hinged sections.

16. Apparatus for reshaping and compressing plantation cotton bales consisting of a reshaping press and a compress the latter consisting of a frame carrying a series of boxes into which the cotton is forced from the reshaping press, a platen, a plunger, and a head, the upper end of each box being made of hinged sections, a latch secured to one section and engaging a keeper on the other section and means carried by the platen of the compress for disconnecting the latch from its keeper whereby the hinged sides will be permitted to open leaving the compressed bale free to be discharged.

17. In a reshaping press the combination of two L-shaped jaws fulcrumed intermediate their ends and adapted to have a closing and opening movement and an endwise movement, and means connecting both jaws whereby a single stroke rearwardly shortens and narrows the bale.

In testimony whereof, I have signed this specification in the presence of two subscribing witnesses.

JOHN L. SHEPPARD.

Witnesses:
S. C. HILL,
A. W. BRIGHT.

Copies of this patent may be obtained for five cents each, by addressing the "Commissioner of Patents, Washington, D. C."